(12) United States Patent
Kadynski et al.

(10) Patent No.: US 9,637,023 B2
(45) Date of Patent: May 2, 2017

(54) MOTOR CONTROLLER AND METHOD FOR OPERATING A MOTOR CONTROLLER

(71) Applicant: FESTO AG & Co. KG, Esslingen (DE)

(72) Inventors: Dominic Kadynski, Kirchheim (DE); Jan Reimer, Esslingen (DE); Martin Gulla, Esslingen (DE)

(73) Assignee: FESTO AG & CO. KG, Esslingen (DE)

( * ) Notice: Subject to any disclaimer, the term of this patent is extended or adjusted under 35 U.S.C. 154(b) by 0 days.

(21) Appl. No.: 15/141,237

(22) Filed: Apr. 28, 2016

(65) Prior Publication Data

US 2016/0325639 A1    Nov. 10, 2016

(30) Foreign Application Priority Data

May 7, 2015   (DE) .................. 10 2015 208 517

(51) Int. Cl.
*B60L 15/20*   (2006.01)
(52) U.S. Cl.
CPC .................... *B60L 15/20* (2013.01)
(58) Field of Classification Search
CPC ...................................... B60L 15/20
USPC ......................................... 701/22
See application file for complete search history.

(56) References Cited

U.S. PATENT DOCUMENTS

| | | | |
|---|---|---|---|
| 2011/0246133 A1* | 10/2011 | Harada | G01D 5/145 702/151 |
| 2011/0314616 A1* | 12/2011 | Peterson | D06F 35/007 8/137 |
| 2014/0111130 A1* | 4/2014 | Yamada | B60L 3/0038 318/400.32 |
| 2015/0202988 A1* | 7/2015 | De Bossoreille | B60L 11/14 701/22 |
| 2015/0315767 A1* | 11/2015 | Miyamoto | E02F 3/283 701/50 |
| 2016/0178402 A1* | 6/2016 | Klopfenstein | G01D 5/24 368/80 |
| 2016/0226425 A1* | 8/2016 | Kawashima | H02P 27/04 |
| 2016/0325637 A1* | 11/2016 | Payne | G01C 21/3469 |

FOREIGN PATENT DOCUMENTS

| | | |
|---|---|---|
| DE | 102007054421 | 5/2009 |
| EP | 1653240 | 5/2006 |

* cited by examiner

*Primary Examiner* — McDieunel Marc
*Assistant Examiner* — James E Stroud
(74) *Attorney, Agent, or Firm* — Hoffmann & Baron, LLP

(57) ABSTRACT

A motor controller including a control unit designed for receiving and/or processing a movement signal and for outputting a control signal depending on the movement signal, and including a power stage which is designed for enabling an electric energy flow as a function of the control signal, and further including a sensor designed for detecting a movement of the electric motor and for providing a movement-dependent sensor signal to a sensor input of the control unit, wherein the control unit is designed for detecting a usage-dependent load value for a movement system driven by the electric motor and wherein the control unit includes a component memory for storing parameters of components of the movement system, a processing device for combining the parameters with incoming sensor signals to produce a load value and a load value memory for storing the established load value.

11 Claims, 2 Drawing Sheets

MOTOR CONTROLLER AND METHOD FOR OPERATING A MOTOR CONTROLLER

BACKGROUND OF THE INVENTION

The invention relates to a motor controller for providing electric energy to an electric motor, the motor controller comprising a control unit designed for receiving and/or processing a movement signal and for outputting a control signal depending on the movement signal, and comprising a power stage which is electrically connected to the control unit and to an input connection and an output connection and which is designed for enabling an electric energy flow between the input connection and the output connection as a function of the control signal, and further comprising a sensor designed for detecting a movement of the electric motor and for providing a movement-dependent sensor signal to a sensor input of the control unit, wherein the control unit is designed for detecting a usage-dependent load value for a movement system driven by the electric motor. The invention further relates to a method for operating a motor controller.

From EP 1653240 A1, a linear drive device is known, which is designed for performing substantially straight adjusting movements along a linear axis over at least a part of a preset maximum stroke between two end positions. The linear drive device is provided with an electric drive the rotational drive motion of which can be transformed into translational movements by means of transmission means, and it comprises operating data acquisition means for detecting an operating load and/or operating state across a defined period of time, wherein the operating data acquisition means can be connected to power connection means of the electric drive for data acquisition.

SUMMARY OF THE INVENTION

The invention is based on the problem of providing a motor controller and a method for operating a motor controller which, using simple means, facilitates a monitoring of a connected movement system, which consists of an electric motor and a transmission device in particular.

For a motor controller of the type referred to above, this problem is solved by the following features: the motor controller comprising a control unit designed for receiving and/or processing a movement signal and for outputting a control signal depending on the movement signal, and comprising a power stage which is electrically connected to the control unit and to an input connection and an output connection and which is designed for enabling an electric energy flow between the input connection and the output connection as a function of the control signal, and further comprising a sensor designed for detecting a movement of the electric motor and for providing a movement-dependent sensor signal to a sensor input of the control unit, wherein the control unit is designed for detecting a usage-dependent load value for a movement system driven by the electric motor and wherein the control unit comprises a component memory for storing parameters of components of the movement system, a processing device for combining the parameters with incoming sensor signals to produce a load value and a load value memory for storing the established load value.

In this, it is provided that the control unit comprises a component memory for storing parameters of components of the movement system, a processing device for combining the parameters with incoming sensor signals to produce a load value and a load value memory for storing the established load value.

The inventive objective for the motor controller is to facilitate a monitoring of the connected movement system without any complex and expensive additional measures, such as the installation of additional sensors. This being so, the monitoring of the movement system is aimed at load values which are easily determined, such as a cumulative travel and/or a number of movement reversal cycles. For this purpose, parameters of components of the movement system are stored in a component memory of the control unit. These parameters may, for example, be data on a maximum travel of the electric motor and/or a maximum travel of a transmission device connected to the electric motor, in particular a spindle drive or a belt drive.

In addition or alternatively, the parameters can include information on a maximum number of movement reversal cycles for the electric motor and/or the transmission device. These parameters are usually provided by the manufacturer of the component in question (electric motor, transmission device) and are used—taking account of a safety factor, if applicable—for comparison with actually determined load values for deriving warning signals and/or alarm signals therefrom, if appropriate. The parameters may also include threshold values which the processing device can use for assessing whether a movement detected by the sensor should change the load value in any case.

A parameter for an electric motor can, for example, determine at which angle of rotation of a motor shaft of the electric motor the load value is to be changed relative to the distance travelled. In this way, a wear behavior of the electric motor, which may be fitted with plain bearings or ball bearings, for example, can be mapped for as realistic as possible an assessment of the actually experienced loads. The same applies to the transmission device coupled to the electric motor, which can likewise have individual parameters which are stored in the component memory.

The processing device has the purpose of reading out the parameters from the component memory and of taking them into account in a predetermined or freely programmable algorithm provided for processing the sensor signals of the sensor. As a result of linking the parameters to the sensor signals, the processing device provides a load value which can be stored in the load value memory. It can optionally be provided that the load value stored in the load value memory is compared to the parameters from the component memory by the processing device in order to provide warning signals and/or alarm signals, or that the stored load value is made available to an external component such as a higher-order control system.

Advantageous further developments of the invention form the subject matter of the dependent claims.

It is expedient if the control unit comprises a data interface designed for providing load values from the load value memory, in particular to a higher-order control system, and/or for providing component data to the component memory and/or for receiving movement signals, in particular from a higher-order control system. With the aid of the data interface, the control unit is enabled to communicate with external components such as a higher-order control system and/or a parameterising device. The higher-order control system, which may be a programmable logic controller (PLC) in particular, is possibly designed for reading out cyclically recurrent load values from the load value memory and, on reaching a presettable maximum for the load value, for influencing the motor controller by reducing its load or switching it off. For this purpose, it can in particular be provided that the higher-order control system adjusts movement signals for the motor controller as a function of the read-out load value, in order to delay any further increase of the load value. In addition or as an alternative, the data interface can be designed for making component data available to the component memory, It is preferably provided that the component data of the movement system are determined before the initial operation of the motor controller; this can, for example, be done with the aid of type codes of the electric motor and/or the transmission device, using a suitable data base of a configuration software in order to then transmit the component data and other configuration information to the motor controller via the data interface. Alternatively, the component data can be directly transferred from the data sheets for the components of the movement system to the component memory via the data interface, using a suitable inputting device, in particular a personal computer. For this purpose, the component memory can in particular be provided with a web server providing a presettable user interface for the inputting device. The data interface can further be designed for a communication, in particular a bus communication or a multipole communication, according to the I/O link protocol with a higher-order control system for the exchange of movement signals and/or load values.

In an advantageous further development of the invention, it is provided that the processing device is designed for determining a travel provided at an output interface of the movement system and/or a number of movement reversal cycles performed by the movement system from the sensor signal of the sensor as a load value. This takes into account the fact that the movement system comprises, in addition to the electric motor, a transmission device, which may, for example, be a belt drive, a gear mechanism or a spindle drive with a threaded spindle and which is in any case provided for converting the rotary motion of the electric motor into a rotary or linear movement. The motor controller is designed such that, in the determination of the load values, it can take into account both the characteristics of the electric motor and those of the transmission device, in order to facilitate as complete as possible a mapping of the properties of the movement system in the load value. As a system limit for the determination of the load value, the output interface of the movement system is usually used, which may, for example, be an output element of a gear mechanism or a coupling rod of a spindle drive or a coupling to a toothed belt. By way of example, it may be provided that the load value exclusively reflects the travel at the output interface, or that the load value takes into account both the travel of a motor shaft of the electric motor and the travel at the output interface. The determination of the number of movement reversal cycles should be based on the assumption of a positive coupling between the motor shaft of the electric motor and the transmission device, so that only the movement reversal cycles of the motor shaft of the electric motor have to be taken into account.

The processing device is preferably designed for pre-processing the sensor signal before determining the load value in such a way that movements of the electric motor below a presettable movement threshold do not have any influence on the load value. By this pre-processing of the sensor signals, effects such as noise of the sensor signal and properties such as different constructions of the electric motor and/or the transmission device can be taken into account. The sensor signal provided by the sensor can, because of deficiencies of the sensor and/or because of interference in electric lines between the sensor and the processing device caused by electric noise which occurs as a general disturbance variable with a wide, unspecified frequency spectrum and therefore as a persistent fluctuation of a signal level of the sensor signal, result in the misinterpretation of the actual movement behavior of the electric motor and/or the transmission device. To reduce the effect of this noise, the pre-processing of the sensor signal includes a check whether the sensor signal exceeds a preset threshold value (hysteresis value or hysteresis interval) relative to a presettable reference value. The sensor signal is only processed in the algorithm of the processing device if the threshold value is actually exceeded. In the process of pre-processing the sensor signal, properties of the electric motor and/or the transmission device which affect the above threshold value can be taken into account as well. A threshold value for an increase of the load value can, for example, be set differently for an electric motor with ball bearings and for an electric motor with plain bearings, because small swivel angles for the motor shaft of the electric motor affect the actual wear of the electric motor depending on the bearing arrangement, for example. The respective threshold value is a part of the parameter(s) for the respective component of the movement system.

In a further embodiment of the invention, it is provided that the control unit is designed for providing status signals, in particular warning signals and/or alarm signals, at the data interface. The status signals can be determined by comparing the calculated load value to the component data. It may, for example, be provided that warning signals are output if a presettable percentage of a maximum travel and/or a maximum number of movement reversal cycles is reached. This is intended to enable an operator of the movement system to take preventive measures such as service operations or the purchase of spares. An alarm signal can be output if a maximum travel and/or a maximum number of movement reversal cycles is reached. In this case, a disconnection of an energy supply for the electric motor or a switch-over to a tail-safe mode with reduced speed of movement can be provided for within the motor controller or by means of suitable signal transmission to a higher-order control system via the data interface.

It is advantageous if the processing device is designed for providing encoded load values, and/or if the load value memory is designed for an irreversible storage of load values. These measures are intended to prevent the manipulation of stored load values, because the load values are possibly used in the assessment of warranty claims or in the assessment of the condition of the movement system within a value investigation. By way of example, it may be provided that the load values determined by the processing device are encoded with the aid of a time stamp and/or by other means in such a way that their manipulation is made difficult or impossible. In addition or alternatively, it may be provided that the load value memory is provided with memory cells for the load values which permit only a single writing of load values, thereby preventing a deletion of stored load values.

It is expedient if the sensor is designed for detecting a direction of rotation of a motor shaft of the electric motor, and/or if the control unit is designed for detecting a usage-dependent load value exclusively by way of the sensor signal of the sensor. Information on the direction of rotation of the motor shaft of the electric motor facilitates a determination of the movement reversal cycles for the electric motor and the transmission device of the movement system connected to the former. This applies in particular if the motor controller has a very simple structure with only one sensor for ensuring that the movement system can be produced cost-effectively.

The problem of the invention is further solved by a method fin• operating a motor controller wherein the processing device, for determining a load value, carries out a pre-processing of the sensor signal using at least one threshold value from the group: travel, speed of movement, acceleration and determines the load value only if the at least one threshold value is exceeded. In carrying out the method, it can be provided that one or more threshold value(s) is/are used for assessing an actual loading of the components of the movement system. Purely by way of example, it may be provided that the load value is increased only if both a minimum travel and a minimum speed of movement along this minimum travel, for example for the motor shaft of the electric motor and/or for the output interface of the movement system, have been detected. Other combinations of the threshold values are possible as well.

In a further embodiment of the method, it is provided that the processing device changes the load value if a travel determined from the sensor signal exceeds a presettable travel threshold value.

In a further embodiment of the method, it is provided that the processing device, for determining a number of movement reversal cycles executed by the movement system from the sensor signal, determines a direction of movement and changes the load value if a movement in a first direction of movement is followed by a movement in an opposite second direction of movement and if both movements include a travel above a presettable travel threshold value.

BRIEF DESCRIPTION OF THE DRAWINGS

An advantageous embodiment of the invention is illustrated in the drawing, of which.

DETAILED DESCRIPTION

Figure 1:
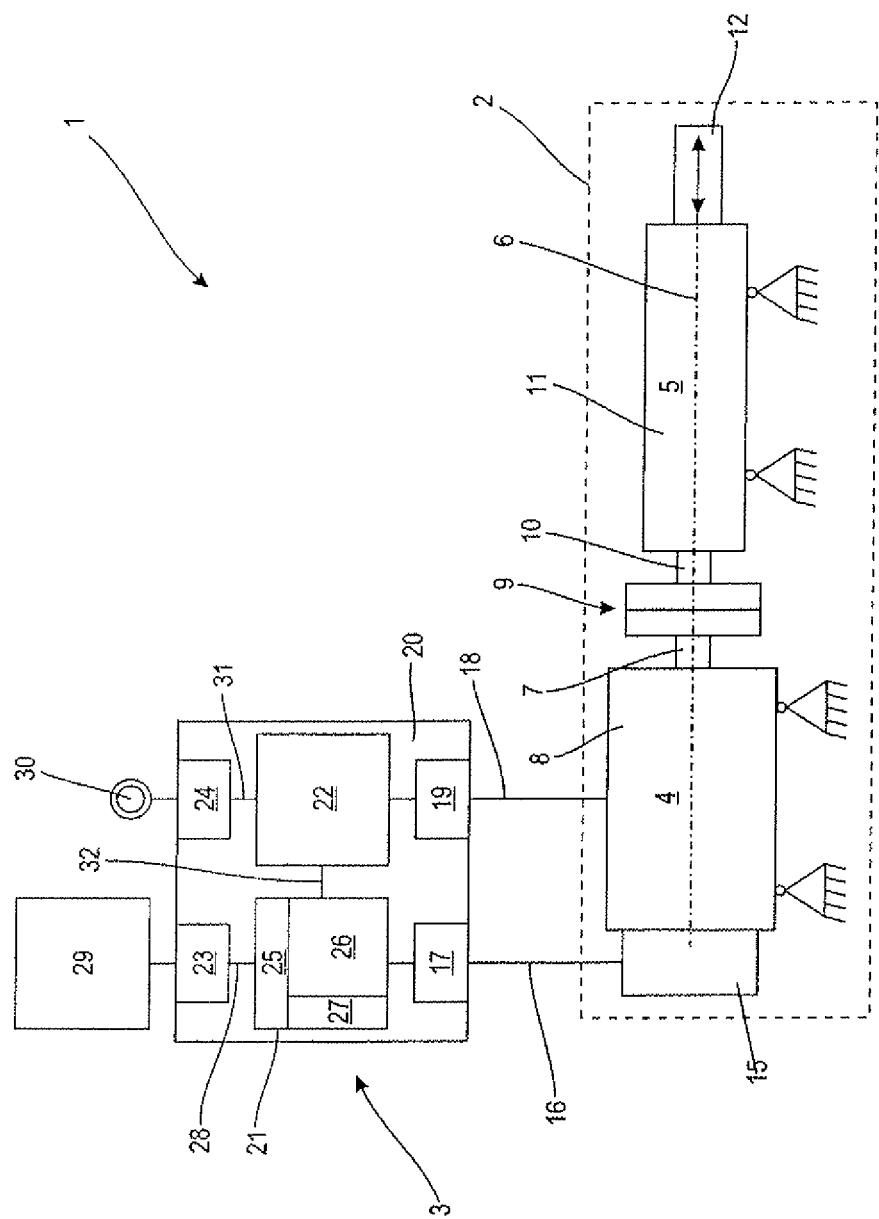
FIG. 1 is a purely diagrammatic illustration of a drive device with a movement system and a motor controller.

FIG. 1 shows a drive device 1, which comprises a movement system 2 and a motor controller 3 coupled to the movement system 2. Purely by way of example, the movement system 2 comprises an electric motor 4, which may be designed as a synchronous motor or as an asynchronous motor, and a spindle drive 5. The electric motor 4 is designed for providing a rotary movement about an axis of rotation 6 and for this purpose comprises a drive shaft 7 rotatably mounted in a motor housing 8. Via a clutch device 9, the drive shaft 7 is permanently connected to a threaded spindle 10 rotatably accommodated in a transmission housing 11. The threaded spindle 10 is positively coupled to a driven rod 12 via a clasp nut not shown in detail; this positive coupling is responsible for a conversion of the rotary movement of the threaded spindle 10 into a linear movement of the driven rod 12 along the axis of rotation 6.

In an end region of the motor housing 8 remote from the drive shaft 7, a sensor 15 designed as a rotary encoder or resolver is provided for the detection of rotary movements of the drive shaft 7 about the axis of rotation 6. The sensor 15 is connected to a sensor interface 17 of the motor controller 3 via a sensor line 16, the sensor interface 17 being electrically connected to the control unit 21. The electric motor 4 is further connected to a connection interface 19 of the motor controller 3 via a connecting line 18 shown purely diagrammatically.

Purely by way of example, the motor controller 3 is formed on a single printed circuit board not shown in detail. Apart from the sensor interface 17 and the connection interface 19, the motor controller 3 comprises a control unit 21, a power stage 22, a data interface 23 and a supply interface 24. The control unit 21 is purely diagrammatically divided into a component memory 25, a processing device 26 and a load value memory 27; to all practical purposes, these can optionally be designed as discrete electronic components, in particular as memory modules or microcontrollers, or as a unitary microcontroller or microprocessor.

In the illustrated embodiment, it is provided that the control unit 21 is electrically connected to the data interface 23 via a data line 28 and therefore capable of communicating with a higher-order control system 29 illustrated diagrammatically only. For this communication, the use of a bus protocol or a parallel data communication is provided, for example. Accordingly, the data interface 23 is optionally designed as a bus node or as a terminal assembly, The supply interface 24 is electrically connected to a power source 30 likewise illustrated diagrammatically only. The electric energy provided by the power source 30 is fed to the power stage 22 via a supply line 31 and can there be made available to the connection interface 19 as a function of control signals of the control unit 21.

The control unit 21 can optionally be designed for receiving a movement signal provided by the control system 29 or for an internal provision of the movement signal using a movement sequence stored in the control unit 21, in particular as control software. Via the control line 32, the control unit 21 makes the movement signal available to the power stage 22, which is preferably an electronic circuit breaker or an arrangement of such circuit breakers and where on the basis of the movement signal electric energy is released for the electric motor 4 by the power source 30 as appropriate.

If electric energy is released in this way, a rotary movement is induced in the drive shaft 7 of the electric motor 4, with the result that the sensor 15 outputs sensor signals to the sensor line 16. Purely by way of example, it is provided that the sensor 15 outputs an analogue sensor signal. The sensor signal is fed to the processing device 26, which, involving a clock signal for example, is designed for determining a rotary speed and/or an angular velocity and/or an angular acceleration, in particular a cumulative travel, for the movement of the drive shaft 7.

The processing device 26 is further designed for reading out and processing parameters of the electric motor 4 and/or the spindle drive 5, which are stored in the component memory 25.

By way of example, it is provided that a maximum travel for the electric motor 4 and a maximum travel for the spindle drive 5 are stored in the component memory 25 and that the processing device is, by suitable programming, configured to calculate, using the available sensor signals, a first load value for the electric motor 4 and a second load value for the spindle drive 5 and to compare the determined load values to the stored maximum travel values.

Figures 2, 3:
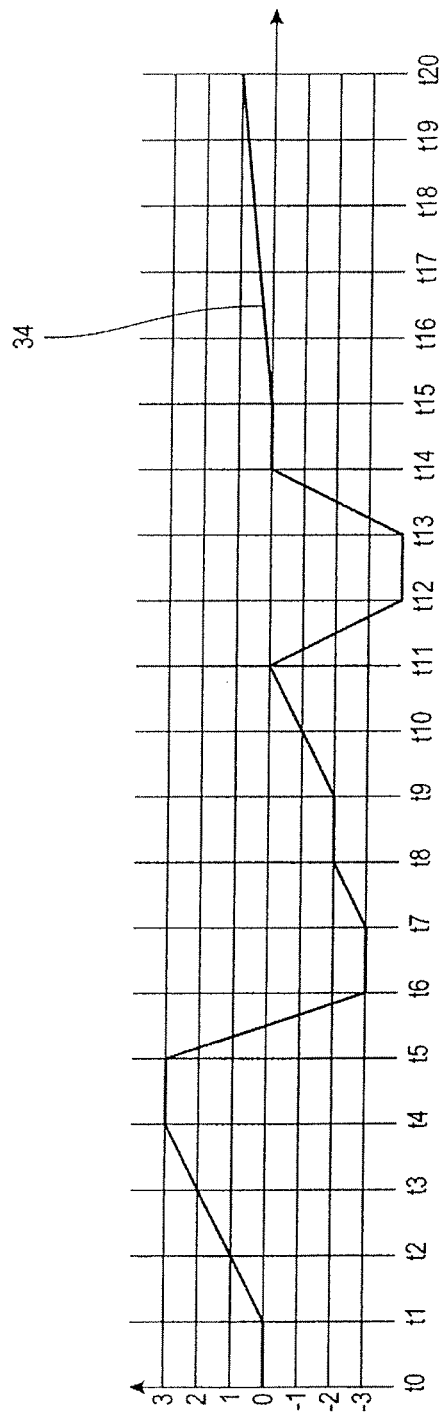
FIG. 2 is a graphic illustration of different movement sequences for the movement system.
FIG. 3 is a table with load values for components of the drive system shown in FIG. 1.

The procedure provided for this can be seen in FIGS. 2 and 3 by way of example. FIG. 2 shows a progression for the travel of the drive shall 7 as determined from the sensor level (not shown) of the sensor 15; in the diagram of FIG. 2, the time is plotted on the abscissa (horizontal axis), while the distance travelled by the drive shaft 7 is plotted on the ordinate (vertical axis).

The first line of FIG. 3 contains values for the cumulative travel, while the second line contains values for the number of movement reversal cycles.

Between a point in time t0 and a point in time t1, a stationary drive shaft 7 is assumed. This being so, the travel 34 and the value for the number of movement reversal cycles 35 are not changed in the illustration of FIG. 3.

At a point in time t1, a positive movement of the drive shaft 7 starts; this is indicated by the travel 34 increasing up to the point in time t4. Purely by way of example, it is provided that the value for the cumulative travel is increased if a change of the travel 34 exceeds a purely exemplary hysteresis interval with an interval width of two units according to FIG. 3, which is central to a reference value set, for example, at 0 units at the point in time t1. Accordingly, at the points in time t2, t3 and t4, the cumulative value for the travel 34, which is also described as load value, is increased.

Between the points in time t4 and t5, there is no movement of the drive shaft 7, so that the travel 34 is not changed either.

From the point in time t5, there is a negative movement of the drive shaft 7, which is represented by the travel reducing up to the point in time t0. As the presettable hysteresis interval is exceeded between the points in time t5 and t6, the amount of the movement between these two points in time is apportioned to the cumulative value for the travel 34 in its entirety.

Furthermore, as a result of the reversal of the movement of the drive shaft 7 at the point in time t5, the value for the number of movement reversal cycles 35 (also described as load value) is increased as well, because the processing device 26 can now, starting from the preceding positive movement of the drive shaft 7 exceeding the hysteresis interval, observe a negative movement of the drive shaft 7 exceeding the hysteresis interval and therefore increases the value for the number of movement reversal cycles 35 by 1.

In the following positive rotary movements between the points in time t7 and t8 as well as t9 and 01, the hysteresis interval is exceeded in each case, so that the cumulative value for the travel 34 is increased accordingly. Furthermore, the value for the number of movement reversal cycles 35 is also increased further at the point in time t8. The negative movement between the points in time 111 and 112 results in a corresponding increase of the cumulative value for the travel 34. The same applies to the positive movement between the points in time t13 and t14, which is accompanied by a further increase of the value for the number of movement reversal cycles 35.

A rest up to the point in time 115 is followed by a very slow positive movement of the drive shaft 7, which only exceeds the hysteresis interval at the point in time t20, leading to an increase of the cumulative value for the travel 34.

By way of example, it can be provided that the last value for the travel 34 which has resulted in a change to the cumulative value for the travel 34 is stored as reference value for a subsequent assessment of travel and movement reversal cycles on this basis.

The invention claimed is:

1. A motor controller for providing electric energy to an electric motor, the motor controller comprising a control unit designed for receiving and/or processing a movement signal and for outputting a control signal depending on the movement signal, and comprising a power stage which is electrically connected to the control unit and to an input connection and an output connection and which is designed for enabling an electric energy flow between the input connection and the output connection as a function of the control signal, and further comprising a sensor designed for detecting a movement of the electric motor and for providing a movement-dependent sensor signal to a sensor input of the control unit, wherein the control unit is designed for detecting a usage-dependent load value for a movement system driven by the electric motor, wherein the control unit comprises a component memory for storing parameters of components of the movement system, a processing device for combining the parameters with incoming sensor signals to produce a load value and a load value memory for storing the established load value.

2. The motor controller according to claim 1, wherein the control unit comprises a data interface designed for providing load values from the load value memory and/or for providing component data to the component memory and/or for receiving movement signals.

3. The motor controller according to claim 2, wherein the data interface is designed for providing load values from the load value memory to a higher-order control system, and/or for receiving movement signals from a higher-order control system.

4. The motor controller according to claim 1, wherein the processing device is designed for determining a travel provided at an output interface of the movement system and/or a number of movement reversal cycles performed by the movement system from the sensor signal of the sensor as a load value.

5. The motor controller according to claim 1, wherein the processing device is designed for pre-processing the sensor signal before determining the load value in such a way that movements of the electric motor below a presettable movement threshold do not have any influence on the load value.

6. The motor controller according to claim 1, wherein the control unit is designed for providing status signals at the data interface.

7. The motor controller according to claim 1, wherein the processing device is designed for providing encoded load values, and/or wherein the load value memory is designed for an irreversible storage of load values.

8. The motor controller according to claim 1, wherein the sensor is designed for detecting a direction of rotation of a motor shaft of the electric motor, and/or wherein the control unit is designed for detecting a usage-dependent load value exclusively by way of the sensor signal of the sensor.

9. A method for operating a motor controller according to claim 1, wherein the processing device, for determining a load value, carries out a pre-processing of the sensor signal using at least one threshold value from the group: travel, speed of movement, acceleration and determines the load value only if the at least one threshold value is exceeded.

10. The method according to claim 9, wherein the processing device changes the load value if a travel determined from the sensor signal exceeds a presettable travel threshold value.

11. The method according to claim 9, wherein the processing device, for determining a number of movement reversal cycles executed by the movement system from the sensor signal, determines a direction of movement and changes the load value if a movement in a first direction of movement is followed by a movement in an opposite second direction of movement and if both movements include a travel above a presettable travel threshold value.

\* \* \* \* \*